US012280382B2

(12) United States Patent
Anderson et al.

(10) Patent No.: US 12,280,382 B2
(45) Date of Patent: Apr. 22, 2025

(54) ELECTRONICALLY CONTROLLED HYDRAULIC DECANTER CENTRIFUGE

(71) Applicant: Elgin Separation Solutions Industrials, LLC, Stafford, TX (US)

(72) Inventors: Michael Rai Anderson, Sugar Land, TX (US); Emad Tariq Babri, Katy, TX (US); William Merida, League City, TX (US)

(73) Assignee: ELGIN SEPARATION SOLUTIONS INDUSTRIALS, LLC, Stafford, TX (US)

( * ) Notice: Subject to any disclaimer, the term of this patent is extended or adjusted under 35 U.S.C. 154(b) by 973 days.

(21) Appl. No.: 17/357,352

(22) Filed: Jun. 24, 2021

(65) Prior Publication Data

US 2022/0410177 A1 Dec. 29, 2022

(51) Int. Cl.
*B04B 1/20* (2006.01)
*B04B 9/06* (2006.01)
(Continued)

(52) U.S. Cl.
CPC .............. *B04B 1/2016* (2013.01); *B04B 9/06* (2013.01); *B04B 13/00* (2013.01); *F04B 17/03* (2013.01);
(Continued)

(58) Field of Classification Search
CPC ......... B04B 1/2016; B04B 9/06; B04B 13/00; B04B 1/20; F04B 17/03; F04B 49/065; F04B 49/20; F04B 49/22; F04B 2203/0209; F04B 2205/05; F04B 2205/09
See application file for complete search history.

(56) References Cited

U.S. PATENT DOCUMENTS 4,668,213 A * 5/1987 Kraemer ............... B04B 1/2016 494/9
5,494,584 A * 2/1996 McLachlan .......... B01D 21/302 210/512.1
(Continued)

FOREIGN PATENT DOCUMENTS

CN 212120402 U * 12/2020
DE 2551789 A1 6/1977
(Continued)

OTHER PUBLICATIONS

International Search Report and Written Opinion of the International Application No. PCT/US2022/034489, mailed Nov. 3, 2022, 13 pg.

*Primary Examiner* — Walter D. Griffin
*Assistant Examiner* — Shuyi S. Liu
(74) *Attorney, Agent, or Firm* — Fredrikson & Byron, P.A.

(57) ABSTRACT

A centrifuge system includes a centrifuge and a feed line fluidly connected to centrifuge with the centrifuge driven by a hydraulic system. The hydraulic system includes an electric motor driving a hydraulic pump connected to a fluid reservoir with the hydraulic pump providing hydraulic fluid to one or more hydraulic motors which in turn rotate the centrifuge. The system includes a pressure sensor for measuring fluid pressure and a speed sensor for measuring the rotational speed of the centrifuge. A controller can be in communication with the hydraulic system and the sensors and can receive measurements from the sensors and adjust the pressure of hydraulic fluid flowing to the one or more hydraulic motors to maintain a rotational speed of the centrifuge based on differing loads. The system can include one or more valves, controlled by the controller, which can also adjust the hydraulic pressure of the system.

15 Claims, 6 Drawing Sheets

(51) Int. Cl.

| | |
|---|---|
| ***B04B 13/00*** | (2006.01) |
| ***F04B 17/03*** | (2006.01) |
| ***F04B 49/06*** | (2006.01) |
| ***F04B 49/20*** | (2006.01) |
| ***F04B 49/22*** | (2006.01) |

(52) U.S. Cl.
CPC ............ *F04B 49/065* (2013.01); *F04B 49/20* (2013.01); *F04B 49/22* (2013.01); *F04B 2203/0209* (2013.01); *F04B 2205/05* (2013.01); *F04B 2205/09* (2013.01)

(56) References Cited

U.S. PATENT DOCUMENTS

| | | | | |
|---|---|---|---|---|
| 8,287,419 | B2 | 10/2012 | Chang | |
| 9,010,541 | B2 | 4/2015 | Anderson | |
| 10,711,545 | B2 | 7/2020 | Babri et al. | |
| 10,865,611 | B2 | 12/2020 | Anderson et al. | |
| 2016/0003265 | A1* | 1/2016 | Joung | E02F 9/2235 60/431 |
| 2016/0319615 | A1 | 11/2016 | Babri et al. | |
| 2019/0134646 | A1* | 5/2019 | Takahashi | B04B 7/06 |
| 2019/0170247 | A1* | 6/2019 | Hafvenstein | F16H 61/47 |
| 2022/0152927 | A1* | 5/2022 | Zavoyskikh | B29C 64/245 |
| 2022/0259821 | A1* | 8/2022 | Takahashi | E02F 9/2296 |
| 2022/0355314 | A1* | 11/2022 | Shipmaker | B04B 11/02 |

FOREIGN PATENT DOCUMENTS

| | | | | | |
|---|---|---|---|---|---|
| EP | 189164 | A2 | | 7/1986 | |
| KR | 20180081315 | A | * | 7/2018 | B04B 1/20 |
| KR | 1020180081315 | A | | 7/2018 | |
| WO | 9415690 | A1 | | 7/1994 | |
| WO | WO-2012039083 | A1 | * | 3/2012 | B60L 11/18 |

* cited by examiner

ELECTRONICALLY CONTROLLED HYDRAULIC DECANTER CENTRIFUGE

BACKGROUND

A decanter centrifuge is a centrifuge which is used to separate components of different densities via buoyancy. Decanter centrifuges include an outer rotating bowl which rotates at a high speed and causes higher density components to settle out of lower density components. Decanter centrifuges also include an inner rotating scroll, which rotates at a different speed than the bowl, to remove the higher density components from the bowl as they are settled out of the lower density components. In some applications, a decanter centrifuge is fed with a fluid mixture containing solids and is used to settle the solids out of the liquid to provide a purer liquid. The speed at which a decanter centrifuge spins can determine the purity of the liquid and a higher speed is generally desired to obtain a purer liquid. The number of solids within the fluid mixture fed to the decanter centrifuge may change and an increase in such a number of solids is correlated to an increased load on the decanter centrifuge.

Currently, decanter centrifuges can be hydraulic driven or electrically driven. Hydraulically driven decanter centrifuges require human engagement to adjust to changing loads. While electrically driven decanter centrifuges may include automatic control systems, they are based on using a variable frequency drive (VFD). In these VFD-driven systems, if the load increases too much, the electric drive of the decanter centrifuge will need to slow down to prevent an overcurrent failure, thereby slowing down the rotation of the decanter centrifuge. Slowing down of the decanter centrifuge will decrease the purity of the final liquid which is undesirable.

SUMMARY

An embodiment of the present disclosure includes a centrifuge system includes a centrifuge having a rotational axis and a feed line fluidly connected with the centrifuge with an amount of feed flowing through the feed line into the centrifuge defining a load on the centrifuge. The system also includes an electric motor, a fluid reservoir for holding hydraulic fluid, and a hydraulic pump. The hydraulic pump is driven by the electric motor, is fluidly connected to the fluid reservoir, and is configured to pump hydraulic fluid from the fluid reservoir. The centrifuge system further comprises one or more hydraulic motors fluidly connected to the hydraulic pump and the fluid reservoir and operatively connected to the centrifuge. The one or more hydraulic motors being configured to provide torque to the centrifuge to rotate the centrifuge about its rotational axis at a rotational speed. The system additionally includes a pressure sensor fluidly connected to the one or more hydraulic motors which is configured to measure a pressure of hydraulic fluid flowing to the one or more hydraulic motors from the hydraulic pump. The centrifuge system also includes a speed sensor configured to measure the rotational speed of the centrifuge and a controller. The controller is in communication with the hydraulic pump, the one or more hydraulic motors, the pressure sensor, and the speed sensor. The controller is configured to receive measurements from the pressure sensor and the speed sensor and adjust the pressure of the hydraulic fluid flowing to the one or more hydraulic motors to maintain the rotational speed of the centrifuge based on differing loads.

In another embodiment of the present disclosure, an electronically controlled hydraulic drive system includes an electric motor, a fluid reservoir for holding hydraulic fluid, and a hydraulic pump. The hydraulic pump is operatively connected to the electric motor and fluidly connected to the fluid reservoir with the hydraulic pump being configured to pump fluid from the fluid reservoir. The hydraulic drive system also includes one or more hydraulic motors fluidly connected to the hydraulic pump with the one or more hydraulic motors configured to rotate a load. The system further includes a pressure sensor fluidly connected to the one or more hydraulic motors which is configured to measure a pressure of hydraulic fluid flowing to the one or more hydraulic motors from the hydraulic pump. Additionally, the system includes one or more valves fluidly connected to the one or more hydraulic motors which are configured to adjust a flow rate of the hydraulic fluid flowing to the one or more hydraulic motors. The system also comprises a sensor configured to measure a rotational speed of the one or more hydraulic motors and a controller. The controller is in communication with the hydraulic pump, the one or more hydraulic motors, the pressure sensor, the one or more valves, and the speed sensor. The controller is configured to receive a pressure measurement from the pressure sensor and a speed measurement from the speed sensor. The controller is also configured to adjust the pressure of hydraulic fluid provided to the one or more hydraulic motors by adjusting the one or more valves to maintain a rotational speed of the load based at least on the received pressure measurement and the speed measurement.

Yet another embodiment of the present disclosure includes a method of controlling a centrifuge system. The method includes determining a rotational speed of a centrifuge using a speed sensor where the centrifuge is operatively connected to one or more hydraulic motors. The one or more hydraulic motors are fluidly connected to a hydraulic pump with the hydraulic pump driven by an electric motor. The method also includes determining a hydraulic fluid pressure between the hydraulic pump and the one or more hydraulic motors. The method further comprises determining an amount one or more valves, fluidly connected between the hydraulic pump and the one or more hydraulic motors, is open, and comparing the rotational speed of the centrifuge to a setpoint. If the rotational speed of the centrifuge is above or below a setpoint, and if the one or more valves are operable to be adjusted further, the method includes adjusting the one or more valves to increase or decrease the rotational speed of the centrifuge to be within the setpoint.

BRIEF DESCRIPTION OF DRAWINGS

The following drawings are illustrative of particular embodiments of the invention and therefore do not limit the scope of the invention. The drawings are not necessarily to scale (unless so stated) and are intended for use with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Those skilled in the art will recognize that many of the noted examples have a variety of suitable alternatives.

Figure 1A:
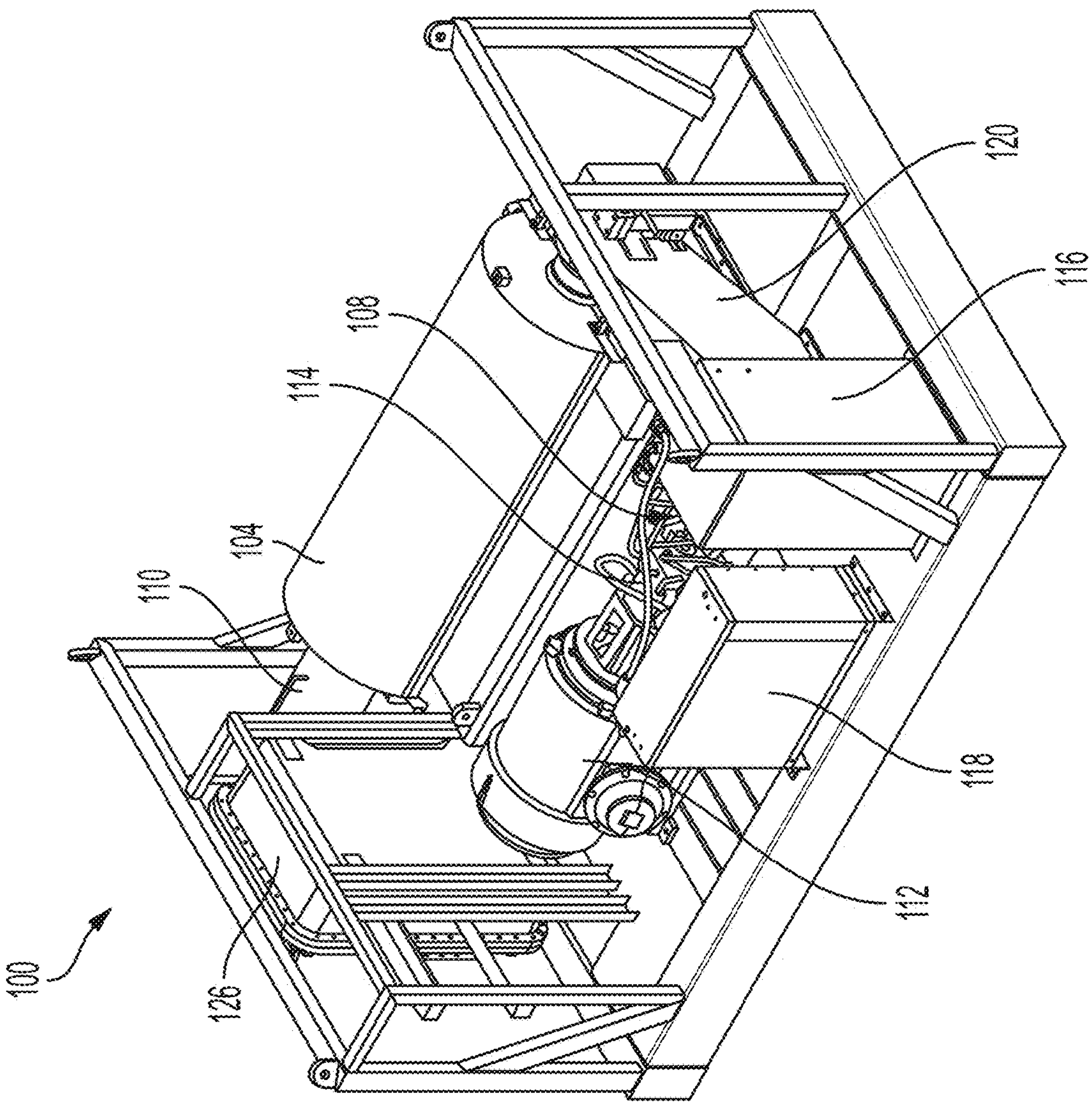
FIG. 1A is an isometric view of an example electronically controlled hydraulic decanter centrifuge according to an aspect of the present disclosure.
Figure 1B:
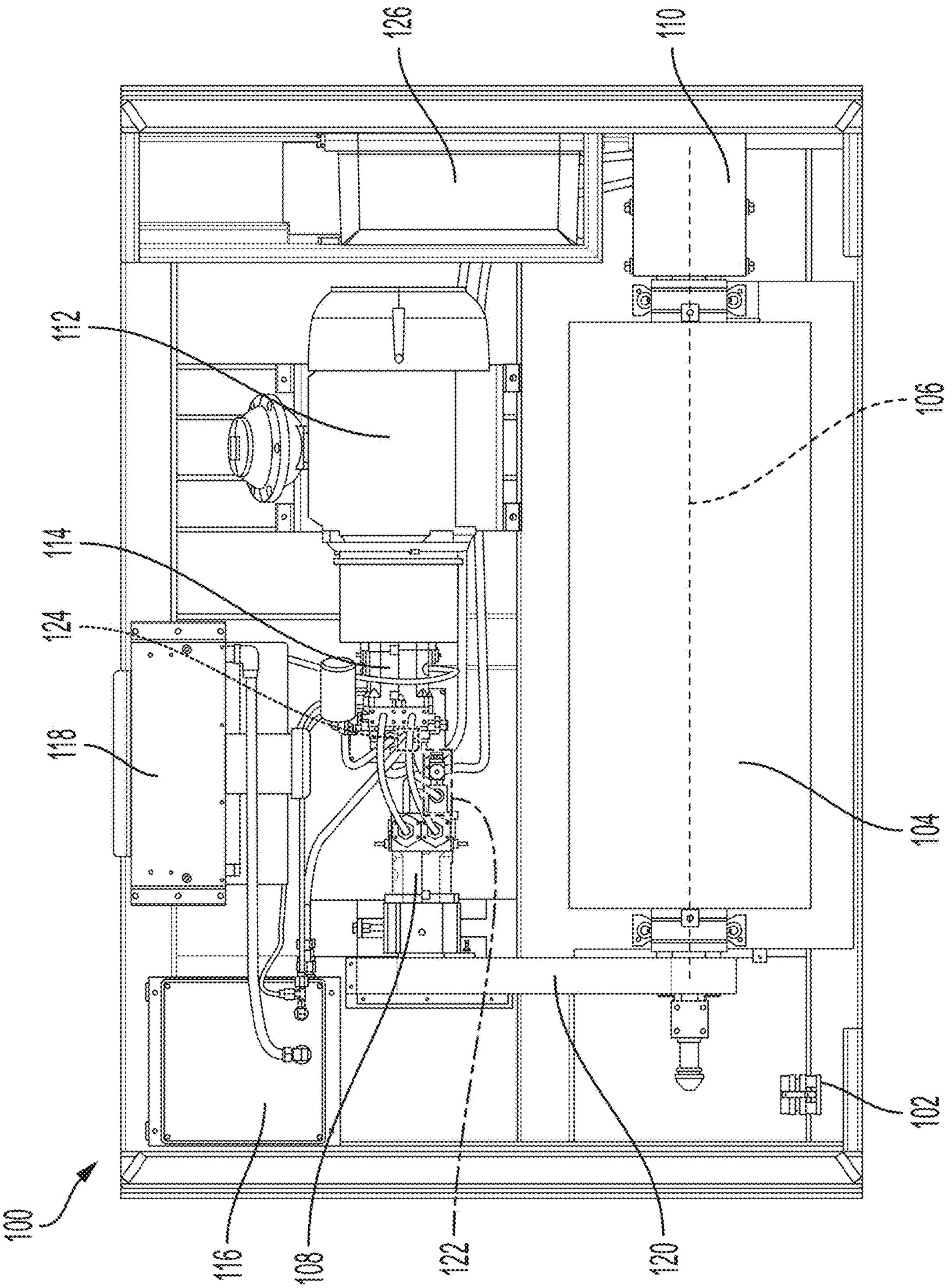
FIG. 1B is a top-down view of the electronically controlled hydraulic decanter centrifuge of FIG. 1A according to an aspect of the present disclosure.

FIG. 1A is an isometric view of an example electronically controlled hydraulic decanter centrifuge system 100 and FIG. 1B is a top-down view of the electronically controlled hydraulic decanter centrifuge system 100 of FIG. 1A. The electronically controlled hydraulic decanter centrifuge system 100 may also be referred to as a "centrifuge system". In the example of FIGS. 1A and 1B, the electronically controlled hydraulic decanter centrifuge system 100, receives a fluid mixture which can contain undesirable solids via a feed line 102. The fluid mixture or "feed" passes through the centrifuge which rotates about its central axis 106 at a rotation speed and causes solids to quickly settle out from the feed due to their higher densities. The solids can be taken away from the centrifuge after being separated from the fluid mixture and the resulting fluid can be pumped, for example, to a storage tank. The rotational speed of the centrifuge can dictate the purity of the resulting fluid with a faster rotational speed leading to fewer undesirable solids being present in the resulting fluid.

Referring to both FIGS. 1A and 1B, the centrifuge system 100, includes a bowl 104 and a scroll (not pictured) which is located inside the bowl 104. The bowl and scroll may be referred to as a "centrifuge" throughout this disclosure. The bowl 104 and scroll are driven by a hydraulic system. In operation, the bowl 104 will rotate about its center axis 106 at a rotational speed while the scroll, located inside the bowl, will rotate about its center axis at a different rotational speed. Together, the bowl 104 and the scroll separate out solids from the feed which is fed into the centrifuge.

Continuing with FIGS. 1A and 1B, the hydraulic system, which drives the bowl 104 includes a primary hydraulic motor 108 for driving the bowl 104 and a secondary hydraulic motor 110 for driving the scroll. The hydraulic system also includes an electric motor 112 which is operatively connected to a hydraulic pump 114. The hydraulic pump 114 is fluidly connected to the primary hydraulic motor 108 and the secondary hydraulic motor 110 via a series of tubes. In some examples, the hydraulic pump includes a filter which can filter contaminants from the hydraulic fluid which it pumps. The hydraulic system further comprises a fluid reservoir 116 fluidly connected to the primary hydraulic motor 108, the secondary hydraulic motor 110, the hydraulic pump 114, and to a heat exchanger 118. The fluid reservoir 116 can hold hydraulic fluid for use by the various parts of the hydraulic system (e.g., hydraulic pump).

In operation of the hydraulic system, the electric motor 112 is powered by a power source and provides mechanical power to the hydraulic pump 114 (e.g., a rotating shaft). In some examples, the electric motor 112 ramps up until it reaches a constant rotational speed. The hydraulic pump 114 can pump hydraulic fluid from the fluid reservoir 116 to the primary hydraulic motor 108 and the secondary hydraulic motor 110 which can cause the hydraulic motors 108, 110 to rotate the bowl 104 and the scroll of the centrifuge, respectively. In FIGS. 1A and 1B, the primary hydraulic motor 108 can rotate the bowl 104 via a coupling 120 (e.g., belt or chain) while the secondary hydraulic motor 110 can rotate the scroll directly. In some examples, only a single hydraulic motor is used to rotate both the bowl of the centrifuge and the scroll of the centrifuge. In some such examples, a series of gears or another mechanism can cause the bowl and scroll to rotate at different speeds. The hydraulic fluid, once passed through the hydraulic motors 108, 110, can return to the fluid reservoir 116 through the hydraulic pump 114. The example of FIGS. 1A and 1B also includes the heat exchanger 118 which is used to cool hydraulic fluid in the hydraulic system and can be connected to the system in a variety of ways. For example, instead of the fluid reservoir 116 providing hydraulic fluid to the hydraulic pump 114 directly, the fluid reservoir 116 can provide hydraulic fluid to the hydraulic pump 114 via the heat exchanger 118.

The hydraulic system further includes one or more valves 122 which are fluidly connected to the hydraulic pump 114 and the primary and secondary hydraulic motors 108, 110. In some examples, the hydraulic system includes a valve for the primary hydraulic motor 108 and a separate valve for the secondary hydraulic motor 110. The one or more valves 122 can be electronically controlled valves, whereby the valves 122 adjust how open or closed they are based on electrical signals provided to them. For instance, in some examples, the one or more valves 122 can adjust how open or closed they are based on a received 0-10-volt (V) signal. In some such examples, applying 0V the one or more valves 122 can completely close the one or more valves 122 while applying 10V can completely open them. In some examples, the voltages directly correspond to a rotational speed of the centrifuge. For instance, in one example, 0V corresponds to 0 rpm while 10V corresponds to 3200 rpm. In operation, the one or more valves 122 can open and close to adjust the amount of fluid passing through them from the hydraulic pump 114 to the hydraulic motors 108, 110. In some examples, adjusting the one or more valves can change a hydraulic fluid pressure between the hydraulic pump 114 and the hydraulic motors 108, 110. For instance, in some examples, adjusting the one or more valves to be more open can increase the hydraulic fluid pressure while adjusting the one or more valves to be more closed can decrease the hydraulic fluid pressure.

In some examples, the hydraulic pump 114 of the hydraulic system can also include its own valves such as pressure relief valve 124. The pressure relief valve 124 can be used to control the maximum pressure at which the hydraulic pump 114 pumps hydraulic fluid. For instance, if the hydraulic fluid being pumped by the hydraulic pump 114 reaches the set maximum pressure, the pressure relief valve will release hydraulic fluid into the fluid reservoir 116 until the hydraulic fluid falls below the maximum pressure. In some examples, the pressure relief valve 124 is controllable such that the maximum pressure can be adjusted. In some such examples, the pressure relief valve 124 is electronically controllable as is described elsewhere herein.

The electronically controlled hydraulic decanter centrifuge system 100 also includes a controller 126. The controller can be electronically connected to various components of the centrifuge system 100 and can be used to control the various components.

Figure 2:
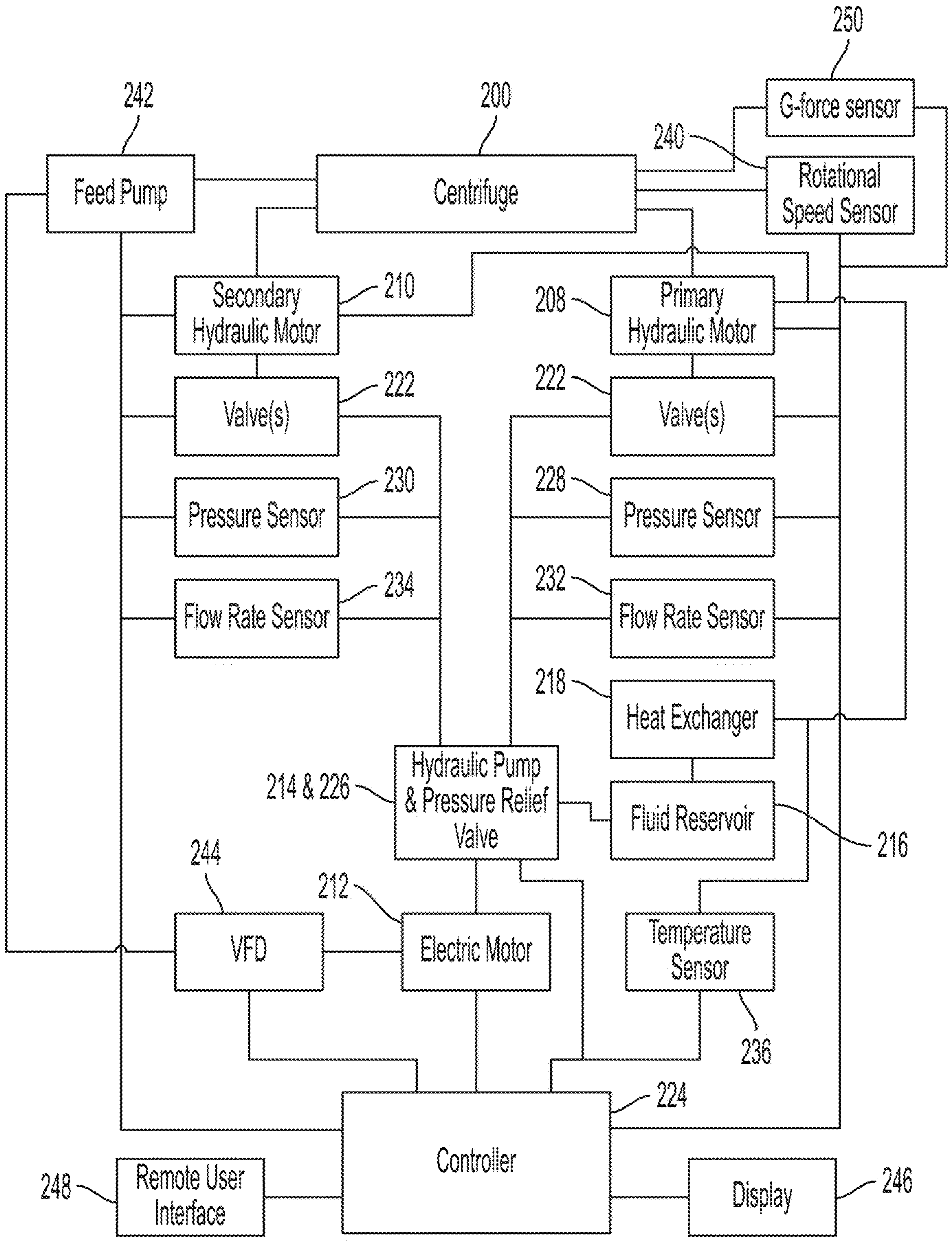
FIG. 2 is a schematic diagram of an example electronically controlled hydraulic decanter centrifuge according to an aspect of the present disclosure.

Moving to FIG. 2, FIG. 2 is a schematic diagram of an example electronically controlled hydraulic decanter centrifuge system according to an aspect of the present disclosure. In similarity with FIGS. 1A & 1B, the centrifuge system of FIG. 2 includes a hydraulic system which comprises a primary hydraulic motor 208, a secondary hydraulic motor 210, an electric motor 212, a hydraulic pump 214, a fluid reservoir 216, a heat exchanger 218, one or more valves 222, and a pressure relief valve 226 which can be part of the hydraulic pump 214. A controller 224 can be in electronic communication with the various components of the hydraulic system.

The example centrifuge system of FIG. 2 also includes a variety of sensors which can be used to measure aspects of the centrifuge, including of the hydraulic system, and provide the measurements to the controller 224. The controller 224 can use such measurements to adjust aspects of the centrifuge such as components of the hydraulic system. For instance, in some examples, the controller 224 can receive inputs from the sensors and can control the hydraulic system to adjust the hydraulic pressure to the hydraulic motors 208, 210.

As illustrated in the schematic diagram of FIG. 2, the centrifuge system can include one or more pressure sensors 228, 230 which can measure a pressure of hydraulic fluid flowing from the hydraulic pump 214 to the hydraulic motors 208, 210. In some examples a primary pressure sensor 228 is used to measure the pressure to the primary hydraulic motor 208 while a secondary pressure sensor 230 is used to measure the pressure to the secondary hydraulic motor 210. However, in some examples, a pressure sensor is included within the hydraulic pump 214 and can measure a pressure of hydraulic fluid as it leaves the hydraulic pump 214 to flow to the primary hydraulic motor 208 and/or secondary hydraulic motor 210. In some examples, more pressure sensors are used to measure the pressure of hydraulic fluid throughout the hydraulic system.

The centrifuge system can also comprise one or more flow rate sensors 232, 234 which can measure the flow rate of hydraulic fluid flowing from the hydraulic pump 214 to the hydraulic motors 208, 210. In some examples a primary flow rate sensor 232 is used to measure the fluid flow to the primary hydraulic motor 208 while a secondary flow rate sensor 234 is used to measure the fluid flow to the secondary hydraulic motor 210. However, in some examples, a flow rate sensor is included within the hydraulic pump 214 and can measure a fluid flow of hydraulic fluid as it leaves the hydraulic pump 214 to flow to the primary hydraulic motor 208 and/or secondary hydraulic motor 210. In some examples, more fluid flow sensors are used to measure the flow of hydraulic fluid throughout the hydraulic system.

The centrifuge system can also comprise a fluid temperature sensor 236 which can measure the temperature of hydraulic fluid flowing from the hydraulic motors 208, 210 to the heat exchanger 218. In some examples, a second temperature sensor is used to measure the temperature of hydraulic fluid after flowing through the heat exchanger 218 but before it flows through the hydraulic pump 214. In some examples, more fluid temperature sensors are used to measure the temperature of hydraulic fluid throughout the hydraulic system.

In addition to the sensors which are associated with the hydraulic system, the centrifuge system can include other sensors. In the example of FIG. 2, for instance, the centrifuge system includes a rotational speed sensor 240 which measures the rotational speed of the bowl of the centrifuge 200 as the bowl rotates about its rotational axis. Measuring the rotational speed of the bowl can be useful as the rotational speed can determine the size and/or number of solids which can be removed from the fluid feed. The centrifuge system can also include torque sensors for measuring the torque applied to the centrifuge and/or gravitational force sensors 250 which can measure the gravitational force produced by the rotation of the centrifuge. In some examples, the electric motor 212 can also include a rotational speed sensor for measuring the rotational of the electric motor 212.

Continuing with FIG. 2, the centrifuge system includes a feed pump 242 which is fluidly connected to the centrifuge 200 via a feed line and can pump feed into the centrifuge 200. The feed pump 242 can be a variable pump which can pump a variable amount of fluid to the centrifuge 200. In some examples, the feed pump 242 can pump from between 0 gallons per minute (gpm) to 250 gpm of feed into the centrifuge 200. The feed pump 242 can be an electric pump and in some examples can be powered by a variable frequency drive (VFD) 244. In some examples, the feed pump 242 is a progressive cavity pump. The VFD 244 can also be used to power electrical components of the centrifuge system such as the electric motor 212.

In an example operation of the centrifuge system of FIG. 2, the feed pump 242 can continuously provide fluid feed to the centrifuge 200 so that the centrifuge 200 can separate out solids from the fluid feed and provide a purer output fluid. The electric motor 212, powered by the VFD or other power source, can drive the hydraulic pump 214. In turn, the hydraulic pump 214 can pump hydraulic fluid from the fluid reservoir 216 to the primary hydraulic motor 208 and the secondary hydraulic motor 210 at a pressure and flow rate. Based on the pressure and flow rate of hydraulic fluid, the primary hydraulic motor 208 and the secondary hydraulic motor 210 can rotate, directly or indirectly (e.g., via a coupling), the bowl and the scroll of the centrifuge 200, respectively. Hydraulic fluid can then flow back to the fluid reservoir 216 through the heat exchanger 218 which can cool the hydraulic fluid.

While the feed pump 242 may continuously provide a set volume of fluid to the centrifuge 200, in some examples, the number of solids within the fluid feed can vary over time. For instance, if the number of solids within the fluid feed increases, the load on the centrifuge 200 will also increase as the mass of the feed fluid flowing into the centrifuge is increased. Barring corrective action, an increase in the load on the centrifuge 200 will cause the centrifuge to decrease in speed, which will decrease the purity of the output fluid. On the other hand, if the number of solids within the fluid feed decreases, the load on the centrifuge 200 will also decrease as the mass of the feed fluid flowing into the centrifuge is decreased. Barring corrective action, a decrease in the load on the centrifuge 200 will cause the centrifuge to increase in speed. While an increase in speed may result in a purer output fluid, an increase outside the desired or set speed can lead to dangerous conditions. To combat these possible issues, a controller (e.g., controller 224) can be used to manipulate aspects of the centrifuge system, such as the hydraulic system, to cause the centrifuge to maintain a relatively constant rotational speed. To determine the manipulation necessary, the controller can use measurements from the sensors to which it is connected.

As illustrated in FIG. 2, the controller 224 is in electronic communication with the components of the hydraulic system including the primary hydraulic motor 208, the secondary hydraulic motor 210, the electric motor 212, and the hydraulic pump 214. The controller is also in electronic communication with the one or more valves 222 and the pressure relief valve of the hydraulic pump 214. Additionally, the controller 224 is in electronic communication with sensors of the centrifuge system including the pressure sensors 228, 230, the flow rate sensors 232, 234, the fluid temperature sensor 236, and the rotational speed sensor 240. In some examples, such as in FIG. 2, the controller is further in electronic communication with the feed pump 242, the VFD 244, and a display 246. Because the controller 224 is in communication with nearly all aspects of the centrifuge system, it can be used to ensure proper operation of the centrifuge system.

While the controller can control many aspects of the centrifuge system, it can be helpful to use the display 246 to display information about the centrifuge system. For example, in some embodiments, the display 246 can display measurements from the sensors and other information including the current measured rotational speed of the centrifuge, the desired or set rotational speed of the centrifuge, the hydraulic pressure at various points in the system including the pressure of hydraulic fluid flowing to the hydraulic motors, the hydraulic fluid temperature, the centrifuge feed rate, the status of the one or more valves and the pressure relief valve (e.g., amount open/closed). A person having ordinary skill will appreciate that the display can display further information about the centrifuge system and that the examples above are not an exhaustive list. In some examples, the display can be an explosion proof display. In some examples, the display can be a touch screen display which can receive input from an operator to control aspects of the centrifuge system such as a set rotational speed of the centrifuge.

In some examples, the controller 224 is electrically connected to a remote user interface 248. The remote user interface 248 can receive inputs from an operator and can communicate the inputs to the controller. In some examples, the remote user interface is a computer running a computer program which receives inputs from an operator and sends corresponding outputs to the controller. For example, the remote user interface can be used by an operator to set a desired centrifuge rotational speed and a desired fluid feed rate. In some examples, the remote user interface can communicate with the controller and the controller can communicate with the components of the centrifuge system to carry out the operation input to the remote user interface by the operator. Using a remote user interface can be advantageous as an operator can be located remotely from the centrifuge system which can be safer for the operator than being located next to the centrifuge system.

Figure 3:
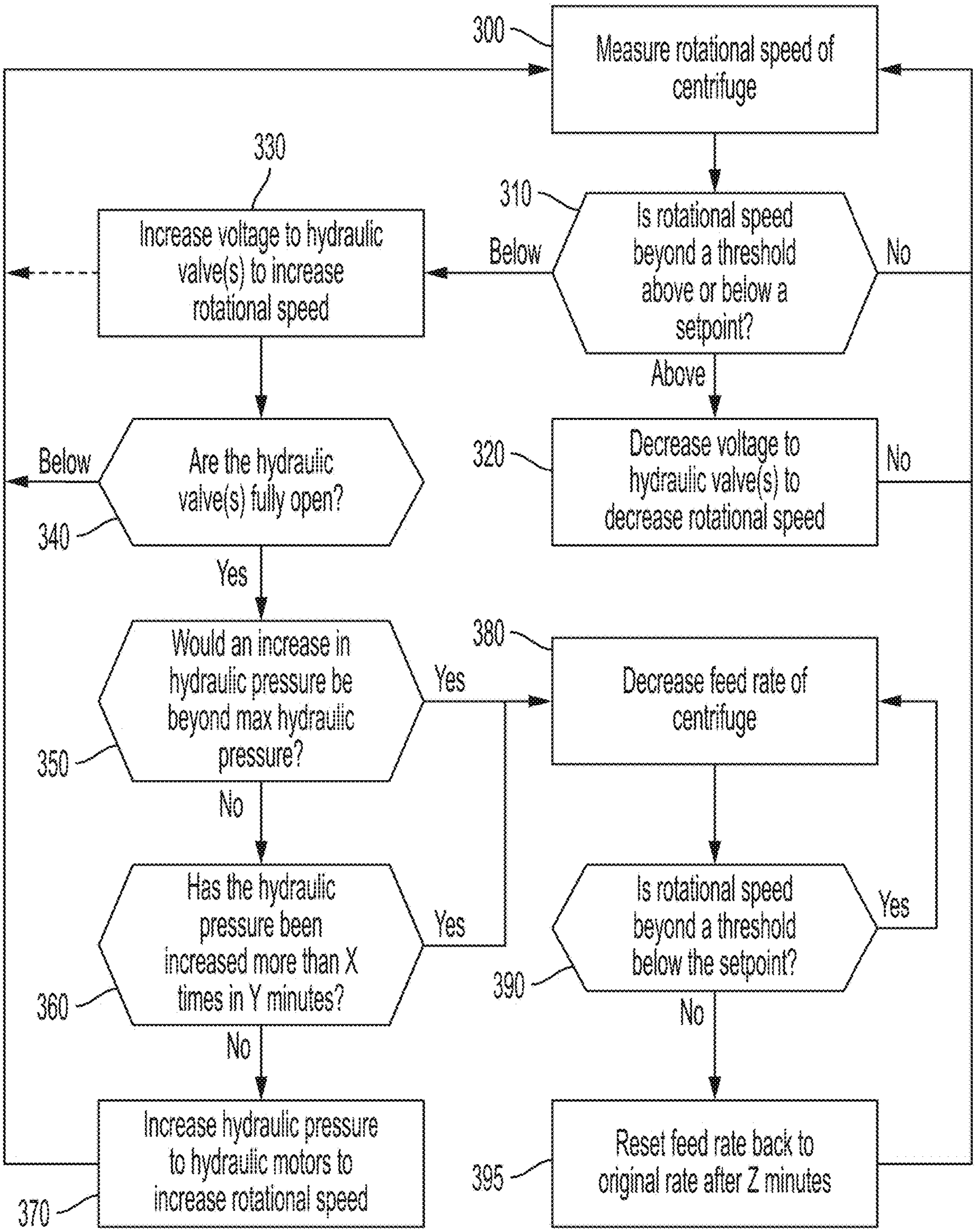
FIG. 3 is a flow diagram illustrating an example operation of an electronically controlled hydraulic decanter centrifuge according to an aspect of the present disclosure.

Moving to FIG. 3, FIG. 3 is a flow diagram illustrating an example operation of the electronically controlled hydraulic decanter centrifuge of FIG. 2 according to an aspect of the present disclosure. In FIG. 3, the rotational speed sensor 240 can measure the rotational speed of the centrifuge 200 at step 300. The controller 224 can receive the measurement of rotational speed from the rotational speed sensor 240 and can compare the rotational speed to a setpoint as in step 310. The setpoint can be a single value or a range of values and can be changed. For instance, in some examples, an operator can adjust the setpoint of the rotational speed to be 2000 rotations per minute (rpm) with an acceptable range of +/−5% (e.g., 1900 rpm-2100 rpm), but can later change the setpoint to be 2500 rpm with an acceptable range of +/−2% (e.g., 2450 rpm-2550 rpm). If the rotational speed is at the setpoint or within the range of the setpoint, the operation of the centrifuge 200 can continue and the rotational speed sensor 240 can continue to measure the rotational speed of the centrifuge 200 as in step 300. If, however, the controller 224 determines the rotational speed is above the setpoint, the controller can reduce the amount the one or more valves 222 are open. For instance, the controller 224 can apply a voltage closer to 0V to the one or more valves 222 to reduce the amount the valves are open, thereby reducing the hydraulic pressure delivered to the primary hydraulic motor 208 and the secondary hydraulic motor 210. A decrease in the hydraulic pressure delivered to the hydraulic motors 208, 210 can reduce the speed at which they drive the centrifuge, thus decreasing the rotational speed of the centrifuge 200. The controller 224 can determine the voltage necessary to apply to the valves to reduce the rotational speed of the centrifuge 200 to within the setpoint. In some examples, though, the controller 224 can only determine the approximate voltage necessary to reduce the rotational speed of the centrifuge 200. Regardless of the amount the rotational speed of the centrifuge 200 is reduced, the operation returns to step 300 where the rotational speed sensor can measure the rotational speed of the centrifuge 200 and to step 310 where the controller 224 can determine if further adjustment is necessary. As a voltage of 0V corresponds to the one or more valves 222 being completely closed, the rotational speed of the centrifuge can be dropped to 0 rpm if needed.

Continuing with step 330 of FIG. 3, if the controller 224 determines that the rotational speed of the centrifuge 200 is below the setpoint, the controller 224 can increase the voltage to the one or more valves 222 to open them further. Assuming the one or more valves 222 are not already fully open, the pressure of the hydraulic fluid delivered to the primary hydraulic motor 208 and the secondary hydraulic motor 210 can increase with the further opening of the one or more valves 222. An increase in the hydraulic pressure delivered to the hydraulic motors 208, 210 can increase the speed at which they drive the centrifuge 200, thus increasing the rotational speed of the centrifuge 200. Additionally, opening the one or more valves further can increase the flow rate of hydraulic fluid flowing from the hydraulic pump 214 to the hydraulic motors 208, 210. This increase can correspond directly to an increase in the rotational speed of the centrifuge. The controller 224 can determine the voltage necessary to apply to the valves to increase the rotational speed of the centrifuge 200 to within the setpoint and can apply said voltage. In some examples, the operation continues by returning to step 300, as shown by the dotted arrow. However, in FIG. 3, after increasing the voltage to open the one or more valves 222, the controller 224 can determine if the one or more valves 222 are fully open in step 340. If the one or more valves 222 are not fully open, the operation of the centrifuge system can continue by returning to step 300. If the one or more valves 222 are fully open, though, the operation of the centrifuge system can continue with step 350. In some examples, the controller can determine if the voltage necessary is beyond the maximum voltage, which corresponds to the one or more valves being greater than fully open, before it applies the voltage. In some such examples, the controller can increase the voltage to the one or more valves to open the one or more valves fully (e.g., in step 330), and immediately go to step 350.

In step 350 of FIG. 3, the controller 224 can determine whether an increase in hydraulic pressure provided to the primary hydraulic motor 208 and the secondary hydraulic motor 210 by the hydraulic pump would be beyond a maximum hydraulic pressure. If an increase in hydraulic pressure would be beyond the maximum, hydraulic pressure, the process can continue with step 380. If an increase in hydraulic pressure would not be beyond the maximum, the process can continue with step 360.

In step 360, the controller 224 can determine if the hydraulic pressure has been increased more than an X number of times within a span of Y minutes. For example, the controller can determine if the hydraulic pressure has been increased more than 5 times within the previous 15 minutes. If the pressure has been increased more than the X number of times within the span of Y minutes, the process can continue with step 380. Otherwise, the process can continue with step 370. In some examples, only one of steps 350 and 360 are used to determine if the process continues with step 370 or 380.

In step 370, the controller 224 can increase the hydraulic pressure delivered to the primary hydraulic motor 208 and the secondary hydraulic motor 210. However, as the one or more valves 222 are fully open in such a case, the controller has to increase the hydraulic pressure in a different way. In some examples, the controller 224 can increase the hydraulic pressure delivered to the hydraulic motors 108, 110 by adjusting the pressure relief valve 226 of the hydraulic pump 214. In such examples, the pressure relief valve 226 can be adjusted by electric control signals from the controller. As the pressure relief valve can limit the maximum pressure of hydraulic fluid that the hydraulic pump 214 can deliver, adjusting the valve by increasing the maximum pressure before the valve releases hydraulic fluid back into the fluid reservoir 216 can cause the hydraulic pump 214 to increase the hydraulic fluid pressure. As discussed with respect to the one or more valves 222, increasing the hydraulic fluid pressure delivered to the hydraulic motors 208, 210 can cause them to drive the centrifuge 200 faster, increasing the rotational speed of the centrifuge 200 up to the desired level.

While increasing the hydraulic pressure delivered to the hydraulic motors 208, 210 can be done by adjusting the pressure relief valve 226, other methods of increasing the hydraulic pressure are contemplated and can be used in addition to, or in lieu of adjusting the pressure relief valve 226. For instance, in some examples, the controller can increase the speed of the electric motor, which can increase the rotation of the hydraulic pump, which can then lead to a higher hydraulic pressure being delivered to the hydraulic motors. Additionally or alternatively, in some examples, the hydraulic pump can be a variable displacement pump. In such examples, the controller can increase the displacement of the hydraulic pump, which can lead to a higher pressure of hydraulic fluid delivered to the hydraulic motors 208, 210. It will be appreciated that the controller can use multiple methods to increase the hydraulic pressure and that they can be used simultaneously.

Once the controller 224 has increased the hydraulic pressure delivered to the hydraulic motors 208, 210 as in step 370, the process can continue by returning back to step 300.

While increasing the hydraulic pressure delivered to the hydraulic motors 208, 210 can increase the rotational speed of the centrifuge 200, it may not always be the best option. As stated with respect to steps 350 there can be a maximum hydraulic pressure. Increasing the hydraulic pressure beyond such a level could risk damage to the hydraulic system or other issues. Additionally, referring to step 360, if the hydraulic pressure has been increased a number of times within a specific timeframe, increasing the hydraulic pressure further may not help to maintain the rotational speed of the centrifuge. Because of at least these reasons, the operation of the centrifuge system can continue with step 380, whereby the controller decreases the feed rate of the centrifuge. By decreasing the feed rate of the centrifuge 200, the load upon the centrifuge will decrease as the total mass of fluid within the centrifuge will decrease. As the load decreases, the centrifuge can speed up as the hydraulic motors will continue to provide the same torque. To decrease the feed rate, the controller 224 can control the feed pump 242 (e.g., using the VFD). In some examples, the controller 224 can decrease the feed rate by adjusting a valve on the feed line 202.

While decreasing the feed rate of the centrifuge 200 can help maintain a relatively constant rotational speed for the centrifuge, decreasing the feed rate can be undesirable as it will increase the time it takes to process the same amount of fluid feed. Additionally, an increase in the mass of the fluid feed, which can be the reason the centrifuge's rotational speed is below the setpoint, can be a temporary issue. Thus, the process can continue with step 390, whereby the controller 224 can determine if the rotational speed of the centrifuge is still below the setpoint using a measurement from the rotational speed sensor 240. If the rotational speed is still below the setpoint, the feed rate can continue to be decreased as in step 380. Once the rotational speed is at or above the setpoint, though, the controller 224 can reset the feed rate back to its original rate after a period of Z minutes as in step 395 and then return to measuring the rotational speed of the centrifuge as in step 300. By resetting the feed rate after a period of time, the controller 224 can keep the feed rate at its desired level and overcome any temporary increases in load caused by an increase in mass of the fluid feed (e.g., an increase in solids within the fluid feed).

While only some sensors are described with respect to the operation of the centrifuge system in FIG. 3, the controller 224 can use the other sensors described elsewhere herein to help maintain the rotational speed of the centrifuge. In some examples, the controller can use the fluid temperature sensor 236 and/or the gravitational force sensor 250 to determine the amount the one or more valves 222 should open or close to maintain the rotational speed of the centrifuge 200. In some examples, the controller can use a torque sensor to determine the amount the one or more valves should open or close to maintain the available torque provided to the centrifuge. In some examples, the other sensors described elsewhere herein can be used to provide alarms or alerts such as a hydraulic fluid temperature alarm for if the hydraulic fluid becomes too hot.

Figure 4:
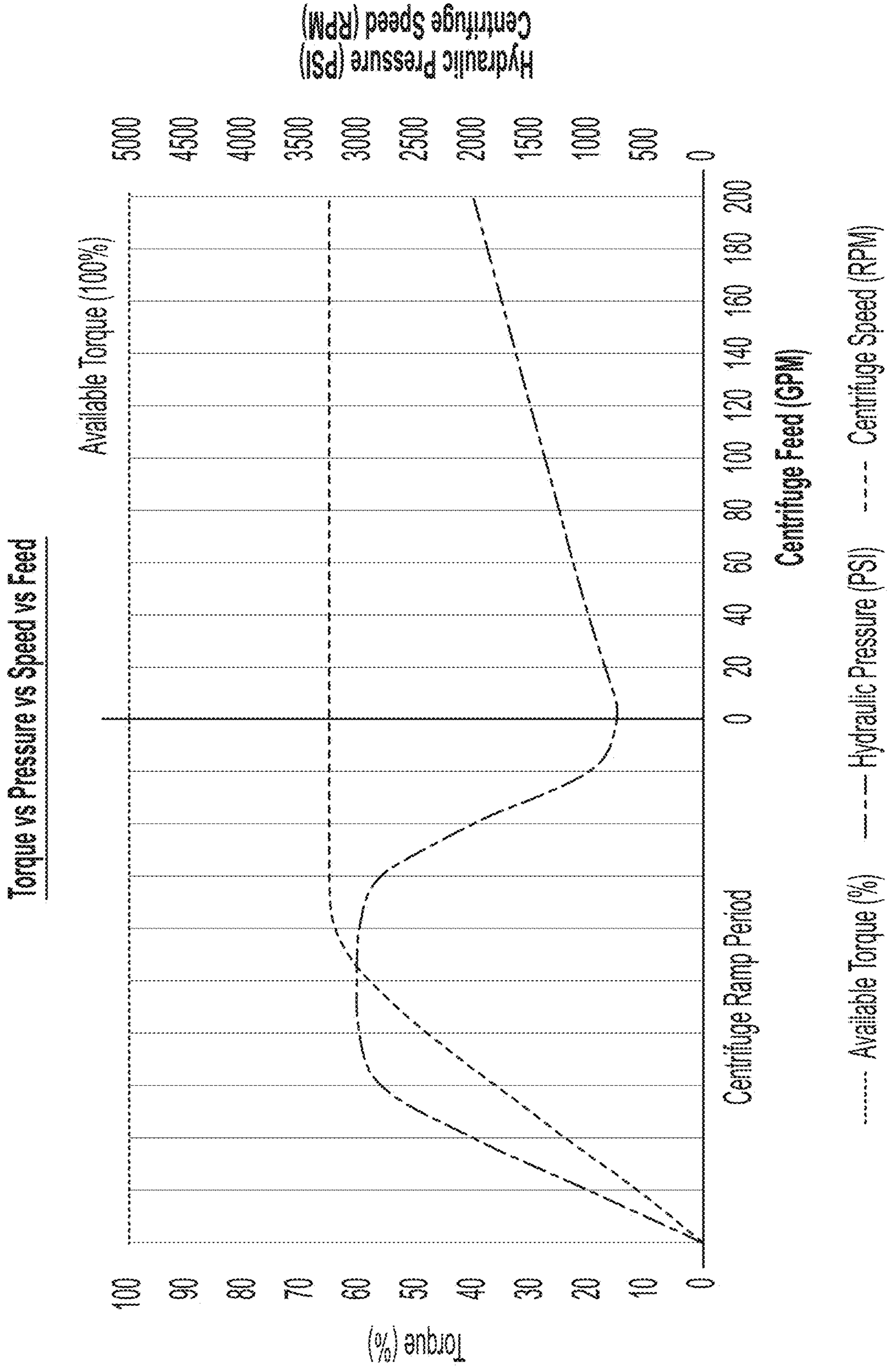
FIG. 4 is a graph illustrating relationships between available torque, hydraulic pressure, rotational speed, and feed rate of an electronically controlled hydraulic decanter centrifuge according to an aspect of the present disclosure.
Figure 5:
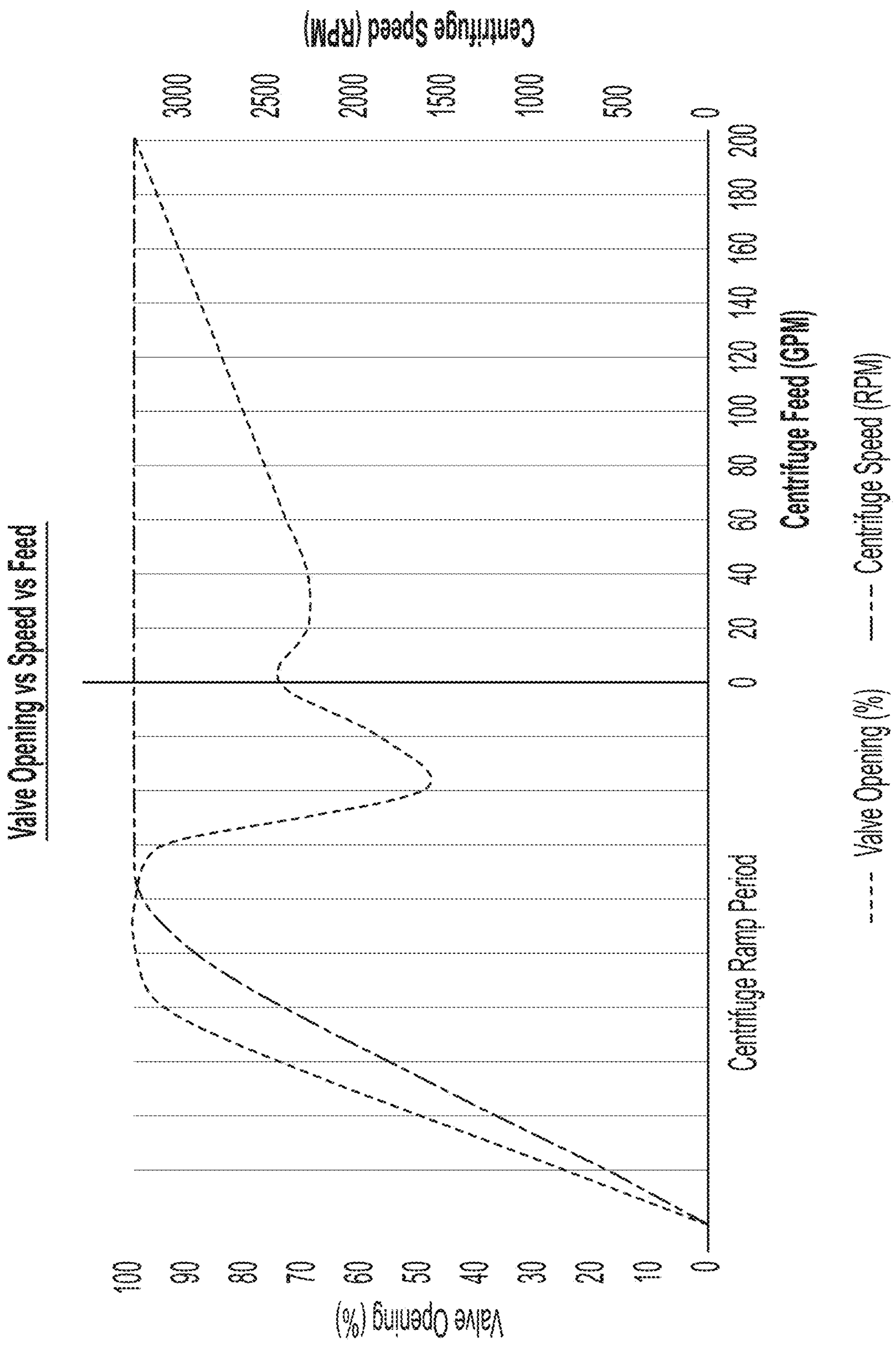
FIG. 5 is a graph illustrating relationships between hydraulic valve opening, rotational speed, and feed rate of an electronically controlled hydraulic decanter centrifuge according to an aspect of the present disclosure.

Moving to FIG. 4-5, FIG. 4-5 are graphs illustrating relationships between various parts of an electronically controlled hydraulic decanter centrifuge according to an aspect of the present disclosure. FIG. 4 illustrates how torque available to drive the centrifuge via the hydraulic motors is related to the hydraulic pressure the motors are running on is related to the rotational speed of the centrifuge is related to the feed rate of fluid fed to the centrifuge via the feed pump. The graph is split into two portions, a ramp up period where no feed is being pumped and the centrifuge increases speed to a set level, and a portion which shows the effects of an increasing centrifuge feed rate on the centrifuge system.

In the ramp up portion, the hydraulic pressure is increased gradually until it reaches a level which can be the maximum hydraulic pressure. As discussed elsewhere herein, various methods can be used to increase the hydraulic pressure including opening one or more valves and/or increasing the rotational speed of the electric motor. The rotational speed of the centrifuge increases with the increase in hydraulic pressure; however, the increase can lag the hydraulic pressure. Further, as the centrifuge reaches its set rotational speed, the hydraulic pressure necessary to keep it rotating at that speed decreases.

In the portion where the centrifuge feed rate is increased, the hydraulic pressure increases from the minimum amount needed to keep the centrifuge rotating at the set speed with no load, to the minimum amount needed to keep the centrifuge rotating at the set speed with the load of the fluid feed. In the example of FIG. 4, the hydraulic pressure can increase linearly with an increase in the centrifuge feed rate. In some examples, the hydraulic pressure increases non-linearly with an increase in the centrifuge feed rate. Throughout the increase in the centrifuge feed rate, the rotational speed of the centrifuge is kept at the set speed. In FIG. 4, the set speed is 3250 rpm, however the set speed can be changed, for instance, by an operator.

Further illustrated in FIG. 4, the torque available to drive the centrifuge via the hydraulic motors remains constant at 100%. This is because the hydraulic pressure can be adjusted to meet the changing load and keep the centrifuge speed constant. This contrasts with direct electric drive centrifuges which can have a reduction in available torque with a changing load. For example, a direct electric drive centrifuge uses an increased amount of current when the load on the electric motor increases so that it can maintain a constant rotational speed. However, the electric motor driving the centrifuge can only handle a certain amount of current before it has to reduce its rotational speed and torque, as too high a current can damage the motor. In some examples, the controller of the electrically controlled hydraulic centrifuge system can be used to maintain a constant available torque provided to the centrifuge as the rotational speed of the centrifuge can be changed (e.g., by an operator).

FIG. 5 illustrates how the amount the one or more valves are open is related to the rotational speed of the centrifuge and is related to the feed rate of fluid fed to the centrifuge via the feed pump. In similarity with FIG. 4, FIG. 5 includes a ramp up period in which the one or more valves are gradually opened to ramp up the rotational speed of the centrifuge to a set speed (e.g., 3250 rpm). As illustrated, the rotational speed of the centrifuge can lag behind the opening of the valve and once the rotational speed is up to the set point, the amount the valve is open can decrease (e.g., via a controller).

The implementation of the controller within the centrifuge system and the operation of the centrifuge system offers several advantages over existing systems. For example, by using a hydraulic system instead of an electric system, which drives the centrifuge with an electric motor directly, the electrically controlled centrifuge system described herein can provide more torque to the centrifuge and allow it to maintain its rotational speed during changing loads. Also, while electrically driven centrifuges can be made explosion proof, the electrically controller centrifuge system can be inherently explosion proof. Additionally, the electrically controlled hydraulic centrifuge system can automatically and dynamically adjust parameters of the hydraulic system to maintain a constant rotational speed for the centrifuge, while current hydraulic systems require manual intervention and further cannot dynamically adjust the load.

Various embodiments have been described. Such examples are non-limiting, and do not define or limit the scope of the invention in any way.

The invention claimed is:

1. A centrifuge system comprising:
- a centrifuge having a rotational axis;
- a feed line fluidly connected with the centrifuge, an amount of feed flowing through the feed line into the centrifuge defining a load on the centrifuge;
- a feed pump in fluid communication with the centrifuge via the feed line, the feed pump configured to pump fluid into the centrifuge at a fluid feed rate;
- an electric motor;
- a fluid reservoir for holding hydraulic fluid;
- a hydraulic pump driven by the electric motor, fluidly connected to the fluid reservoir, and configured to pump hydraulic fluid from the fluid reservoir;
- one or more hydraulic motors fluidly connected to the hydraulic pump and the fluid reservoir and operatively connected to the centrifuge, the one or more hydraulic motors configured to provide torque to the centrifuge to rotate the centrifuge about its rotational axis at a rotational speed;
- a pressure sensor fluidly connected to the one or more hydraulic motors and configured to measure a pressure of hydraulic fluid flowing to the one or more hydraulic motors from the hydraulic pump;
- a speed sensor configured to measure the rotational speed of the centrifuge; and
- a controller, in communication with the hydraulic pump, the feed pump, the one or more hydraulic motors, the pressure sensor, and the speed sensor, the controller configured to:
  - receive measurements from the pressure sensor and the speed sensor;
  - adjust the pressure of the hydraulic fluid flowing to the one or more hydraulic motors to maintain the rotational speed of the centrifuge based on differing loads;
  - determine an increase in hydraulic pressure provided by the hydraulic pump would be beyond a maximum hydraulic pressure; and
  - decrease the fluid feed rate of the feed pump to maintain the rotational speed of the centrifuge.

2. The centrifuge system of claim 1, wherein the controller is further configured to adjust the pressure of the hydraulic fluid to maintain the available torque provided to the centrifuge by the one or more hydraulic motors.

3. The centrifuge system of claim 1, wherein the hydraulic pump comprises a relief valve configured to maintain the pressure of hydraulic fluid flowing to the one or more hydraulic motors from the hydraulic pump.

4. The centrifuge system of claim 1, further comprising one or more valves fluidly connected to the hydraulic pump and the one or more hydraulic motors, the one or more valves in communication with the controller, the controller configured to adjust the one or more valves to adjust the pressure of the hydraulic fluid to maintain the rotational speed of the centrifuge based on differing loads.

5. The centrifuge system of claim 4, further comprising a speed sensor configured to measure a rotational speed of the electric motor operatively connected to the hydraulic pump, the speed sensor in communication with the controller.

6. The centrifuge system of claim 4, further comprising a flow rate sensor fluidly connected to the to the one or more hydraulic motors, in communication with the controller, and configured to measure a flow rate of hydraulic fluid flowing to the one or more hydraulic motors from the hydraulic pump, wherein the controller is configured to adjust the one or more valves to maintain the flow rate of hydraulic fluid flowing to the one or more hydraulic motors from the hydraulic pump.

7. The centrifuge system of claim 1, wherein the centrifuge is a decanter centrifuge, the one or more hydraulic motors comprising a first hydraulic motor and a second hydraulic motor, the first hydraulic motor configured to rotate a bowl of the decanter centrifuge, the second hydraulic motor configured to rotate a scroll of the decanter centrifuge.

8. The centrifuge system of claim 1, further comprising a display in communication with the controller, the display configured to display at least the measured rotational speed of the centrifuge and the pressure of the hydraulic fluid flowing to the one or more hydraulic motors.

9. The centrifuge system of claim 1, further comprising a remote user interface, the controller being in communication with the remote user interface, the remote user interface configured to receive input from a user and sent the input to the controller to control the centrifuge system.

10. The centrifuge system of claim 1, further comprising one or more temperature sensors configured to measure a temperature of the hydraulic fluid, the controller configured to maintain the rotational speed of the centrifuge based in part on the measured temperature of the hydraulic fluid.

11. The centrifuge system of claim 1, further comprising a gravitational force sensor connected to the centrifuge configured to measure a gravitational force provided by the centrifuge, the controller configured to maintain the rotational speed of the centrifuge based in part on the measured gravitational force.

12. The centrifuge system of claim 1, wherein the system is explosion proof.

13. The centrifuge system of claim 1, wherein the controller is configured to adjust the rotational speed of the centrifuge to maintain the available torque provided to the centrifuge.

14. A method of controlling a centrifuge system comprising:

determining a rotational speed of a centrifuge using a speed sensor, the centrifuge operatively connected to one or more hydraulic motors, the one or more hydraulic motors fluidly connected to a hydraulic pump, the hydraulic pump driven by an electric motor;

determining a hydraulic fluid pressure between the hydraulic pump and the one or more hydraulic motors;

determining an amount one or more valves fluidly connected between the hydraulic pump and the one or more hydraulic motors is open;

comparing the rotational speed of the centrifuge to a setpoint; and if the rotational speed of the centrifuge is above or below the setpoint and if the one or more valves are operable to be adjusted further;

adjusting the one or more valves to increase or decrease the rotational speed of the centrifuge to be within the setpoint; and if the rotational speed of the centrifuge is below the setpoint and the one or more valves are not operable to be adjusted further;

decreasing a feed rate of fluid to the centrifuge from a fluid feed line fluidly connected to the centrifuge until the rotational speed of the centrifuge is within the setpoint.

15. The method of claim 14, wherein the setpoint comprises a range of speeds.

* * * * *